(No Model.)

E. E. STEPHENSON & L. A. LASHER.
TRACE AND WHIFFLETREE GUARD.

No. 347,899. Patented Aug. 24, 1886.

UNITED STATES PATENT OFFICE.

ELMER E. STEPHENSON AND LEMUEL A. LASHER, OF SAN FRANCISCO, CAL.

TRACE AND WHIFFLETREE GUARD.

SPECIFICATION forming part of Letters Patent No. 347,899, dated August 24, 1886.

Application filed March 23, 1886. Serial No. 196,305. (No model.)

*To all whom it may concern:*

Be it known that we, ELMER E. STEPHENSON and LEMUEL A. LASHER, both of the city and county of San Francisco, State of California, have invented an Improvement in Trace and Whiffletree Guards; and we hereby declare the following to be a full, clear, and exact description of the same.

Our invention relates to a device which is applicable to the ends of whiffletrees, and the connecting links or traces by which the traveling animals are attached thereto.

It consists of an elongated cup-shaped shoe or cap, within which the end of the whiffletree, the connecting-links, and the end of the trace are inclosed, the outer surface of this shoe being rounded and smooth, so as to form a direct continuation with the trace, and thus prevent any injury to the trees or vines when it is applied to cultivators or other agricultural implements to be used in orchards or vineyards.

Figure 1:
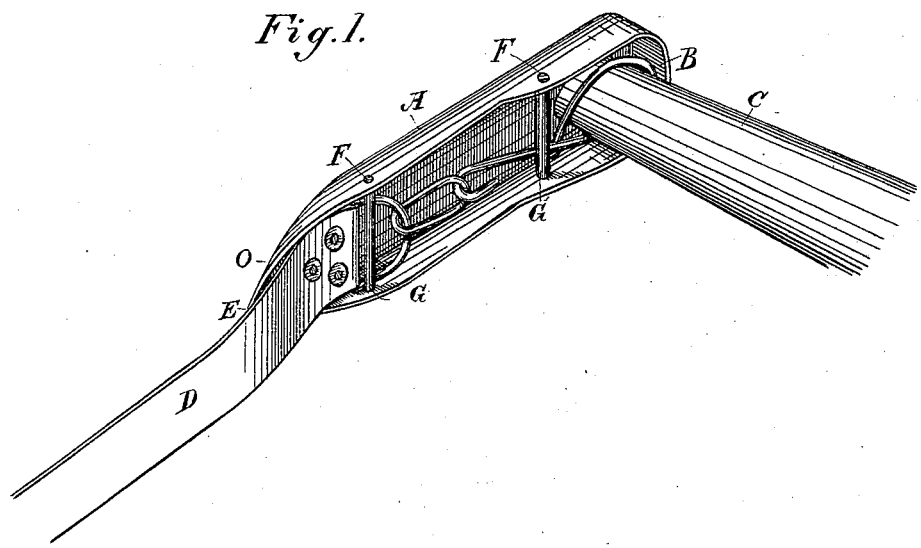
Figure 2:
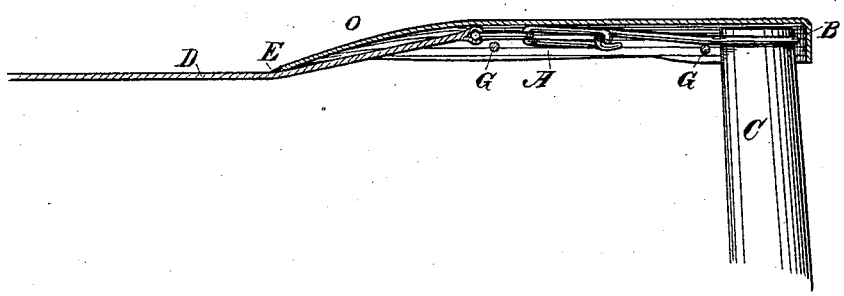

Referring to the accompanying drawings for a more complete explanation of our invention, Figure 1 is a perspective view of one end of a whiffletree, showing our device applied to the connecting-trace. Fig. 2 is a horizontal section taken through the cap, showing its relation to the trace and the whiffletree end.

In plowing, cultivating, or dressing the ground in orchards or vineyards, the ends of the whiffletrees are apt to chafe and damage the trees or vines, and various devices have been contrived to overcome this difficulty, such as bending the end of the trace so as to cover the end of the whiffletree, or by attaching a plate to the trace to extend back over the end of the whiffletree; but in either case either the angular edge of the trace will chafe the tender bark of the trees or vines and cut it or the plate with its attachments will do the same thing.

In our invention we form a hollow cap, A, of considerable length, the outer surface of which is curved or rounded, as shown, and the rear end is bent so as to form a semicircular end, curved in the same manner, so that no angles are presented upon the outer surface. This cap may be made of wood or metal. It is preferably struck up from sheet steel or iron, and the sides extend inwardly far enough to form a trough, which is of considerable depth at the rear end, B, so as to inclose and cover the end of the whiffletree C. The trace D is connected with the whiffletree by means of one or two chain-links and a D-iron, or by means of a cockeye, or other usual devices for making these connections. These portions also lie within the concave or cup-shaped portion of the casing, and the trace extends out therefrom, passing its outer end O. This end is curved inwardly and tapered to a narrow and thin edge or point, as shown at E, so that it presses upon the outer surface of the trace, bending it slightly inward, and thus forms a perfectly smooth surface, so that if the trace is dragging against anything it will pass from the trace against the outside of this protecting-cap without encountering any projecting angle, links, or other obstructions which would chafe it. In order to hold this cap in place, we make holes, as shown at F, through which pins G are introduced, extending from side to side across the concave portion of the cap, so that the trace or links pass in between these pins and the bottom of the cup, which is thus held closely against them, while allowing the end of the whiffletree all the movement that is necessary within it.

It will be manifest that straps, plates, or other devices may be used in place of the pins with the same results.

Having thus described our invention, what we claim as new, and desire to secure by Letters Patent, is—

1. An elongated hollow cup-shaped cap inclosing the end of the whiffletree and its connecting-links, and curved so that its outer end presses against the outer surface of the trace, substantially as herein described.

2. The hollow cup-shaped cap having one end made deeper than the other to receive the end of the whiffletree, and the opposite end tapering to a flat point, which is curved inwardly so as to press upon the outer surface of the trace, which extends within the cap and is connected with the outer end of the whiffletree, substantially as herein described.

3. A hollow cup-shaped cap having the outer surface rounded, one end of said cup forming a cap, into which the end of the whiffletree projects, the other end being drawn out to a flat point and curved inwardly, so as to press upon the trace which extends into the cap, in combination with pins passing vertically through the edges of the cap, and the links connecting the trace with the end of the whiffletree and passing behind these pins, substantially as herein described.

In witness whereof we have hereunto set our hands.

ELMER E. STEPHENSON.
LEMUEL A. LASHER.

Witnesses:
S. H. NOURSE,
H. C. LEE.